United States Patent [19]

Tödtemann et al.

[11] Patent Number: 4,721,774
[45] Date of Patent: Jan. 26, 1988

[54] THERMOPLASTIC MOULDING COMPOSITIONS WITH FLAME-RESISTANT PROPERTIES

[75] Inventors: Gert Tödtemann; Klaus Reinking, both of Wermelskirchen; Otto Koch, Cologne, all of Fed. Rep. of Germany

[73] Assignee: Bayer AG, Leverkusen, Fed. Rep. of Germany

[21] Appl. No.: 27,796

[22] Filed: Mar. 19, 1987

Related U.S. Application Data

[63] Continuation of Ser. No. 797,409, Nov. 12, 1985, abandoned.

[30] Foreign Application Priority Data

Nov. 22, 1984 [DE] Fed. Rep. of Germany ....... 3442571
Dec. 8, 1984 [DE] Fed. Rep. of Germany ....... 3444867

[51] Int. Cl.$^4$ ............................ C08K 5/51; C08K 5/52
[52] U.S. Cl. .................................... 324/139; 524/140; 524/141; 524/511; 524/520
[58] Field of Search ............... 524/139, 140, 141, 511, 524/520; 525/67, 132, 146, 147, 148

[56] References Cited

U.S. PATENT DOCUMENTS

| | | | |
|---|---|---|---|
| 3,290,412 | 12/1966 | Goldblum | 525/147 |
| 3,673,278 | 6/1972 | Bialous | 525/148 |
| 3,773,715 | 11/1973 | Largman et al. | 524/141 |
| 3,786,114 | 1/1974 | Jacquiss et al. | 525/141 |
| 3,809,676 | 5/1974 | Liberti | 524/133 |
| 3,862,998 | 1/1975 | Koehler et al. | 525/147 |
| 3,875,108 | 4/1975 | Koch et al. | 524/141 |
| 3,966,842 | 6/1976 | Ludwig et al. | 525/148 |
| 3,978,020 | 8/1976 | Liberti | 524/133 |
| 4,407,995 | 10/1983 | Dick | 524/133 |
| 4,409,363 | 10/1983 | Brandstetter et al. | 525/67 |
| 4,444,930 | 4/1984 | Guerin et al. | 524/130 |
| 4,450,249 | 5/1984 | Schmidt et al. | 524/141 |
| 4,459,381 | 7/1984 | Trivedi | 524/130 |
| 4,463,130 | 7/1984 | Serini et al. | 525/67 |
| 4,473,685 | 9/1984 | Mark | 525/146 |
| 4,481,338 | 11/1984 | Serini et al. | 525/394 |
| 4,533,689 | 8/1985 | Tayama et al. | 524/130 |

FOREIGN PATENT DOCUMENTS

| | | |
|---|---|---|
| 2162437 | 8/1972 | Fed. Rep. of Germany . |
| 3516807 | 11/1986 | Fed. Rep. of Germany ...... 524/130 |
| 2204649 | 5/1974 | France . |
| 2239512 | 2/1975 | France . |
| 1459648 | 12/1976 | United Kingdom . |

*Primary Examiner*—Morton Foelak
*Assistant Examiner*—Kriellion S. Morgan
*Attorney, Agent, or Firm*—Connolly & Hutz

[57] ABSTRACT

The present invention relates to thermoplastic moulding compositions consisting of halogen-free polycarbonates, styrene/maleic anhydride copolymers, phosphorus compounds of the formula (I)

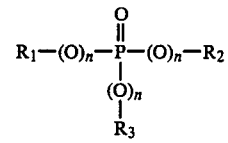

and tetrafluoroethylene polymers and, where appropriate, other known additives.

11 Claims, No Drawings

THERMOPLASTIC MOULDING COMPOSITIONS WITH FLAME-RESISTANT PROPERTIES

This is a continuation of application Ser. No. 797,409, filed Nov. 12, 1985, abandoned.

Blends of 5–95% by weight of aromatic polycarbonates and 95–5% by weight of styrene/maleic anhydride copolymers with 5–30% by weight of maleic anhydride polymerised in are thermoplastic moulding compositions which are markedly superior to the polycarbonates, which they resemble in most technological properties, especially in respect of resistance to hot water and in respect of the flow rates of the melts during thermoplastic processing (German Offenlegungsschrift No. 2,252,974).

However, an essential disadvantage of the blends of aromatic polycarbonates and styrene/maleic anhydride copolymers is that they do not pass the customary fire tests, for example the UL fire tests, Subj. 94.

Although this disadvantage can be eliminated by the incorporation of suitable fireproofing systems, for example of aromatic bromine compounds and of antimony trioxide (see U.S. Pat. No. 4,151,218), this results in other disadvantages, for example difficulties with processing, especially at high temperatures.

Thus, the object of the present invention is to develop flame-resistant polycarbonate blends which do not have these disadvantages.

Hence the present invention relates to thermoplastic moulding compositions consisting of A. 50–90 parts by weight of a thermoplastic, halogen-free, aromatic polycarbonate,
B. 10–50 parts by weight of a halogen-free copolymer, of random structure, comprising 95–70% by weight, preferably 90–75% by weight, of styrene, α-methylstyrene or nuclear-alkylated styrenes, or mixtures of these vinyl aromatics, and 5–30% by weight, preferably 10–25% by weight, of maleic anhydride,
C. 1–20 parts by weight, preferably 5–15 parts by weight, based on 100 parts of the total weight of (A)+(B), of a halogen-free phosphorus compound of the formula

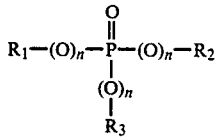

in which $R_1$, $R_2$ and $R_3$ are, independently of one another, a $C_1$–$C_8$-alkyl or an optionally alkyl-substituted $C_6$–$C_{20}$-aryl, and n represents 0 or 1, and D. 0.05–5 parts by weight, again based on 100 parts of the total weight of (A)+(B), in particular 0.1–1 part by weight, of a tetrafluoroethylene polymer.

Thermoplastic, halogen-free aromatic polycarbonates which are suitable according to the invention as component A. are those based on diphenols of the formula (II)

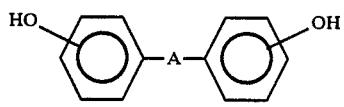

in which A is a single bond, a $C_1$–$C_5$-alkylene, a $C_2$–$C_5$-alkylidene, a $C_5$–$C_6$-cycloalkylidene, or $-SO_2-$.

Examples of suitable diphenols of the formula (II) are hydroquinone, resorcinol, 4,4′-dihydroxydiphenyl, 2,2-bis(4-hydroxyphenyl)propane, 2,4-bis(4-hydroxyphenyl)-2-methylbutane or 1,1-bis(4-hydroxyphenyl)-cyclohexane.

Preferred diphenols of the formula (II) are 2,2-bis(4-hydroxyphenyl)propane and 1,1-bis(4-hydroxyphenyl)-cyclohexane.

The diphenols of the formula (II) are either known from the literature or can be prepared by processes known from the literature.

The preparation of the polycarbonates suitable according to the invention as component A.) is known from the literature and can be carried out, for example, using phosgene by the phase-interface process, or using phosgene by a process in a homogeneous phase (the so-called pyridine process), the molecular weight which is to be set in each case being achieved in a known manner by an appropriate amount of known chain terminators.

The polycarbonates suitable according to the invention as component A.) have mean weight average molecular weights ($\overline{M}w$, measured by, for example, ultracentrifugation or nephelometry) of 10,000 to 100,000, preferably 20,000 to 80,000.

Both homopolycarbonates and copolycarbonates are the polycarbonates which are suitable according to the invention as component A.).

The polycarbonates suitable according to the invention as component A.) can be branched in a known manner, specifically and preferably by the incorporation of 0.05 to 2.0 mol-%, based on the total of moles employed of diphenols, of trifunctional, or more than trifunctional, compounds, for example those having three, or more than three, phenolic OH groups.

Halogen-free polycarbonates within the meaning of the present invention means that the polycarbonates are constructed of halogen-free diphenols, halogen-free chain terminators, and, if appropriate, halogen-free branching agents, the content of minimal ppm amounts of hydrolysable chlorine, resulting from, for example, the preparation of the polycarbonates using phosgene by the phase-interface process, not being regarded as halogen-containing within the meaning of the invention. Polycarbonates of this type, with ppm contents of hydrolysable chlorine, are halogen-free polycarbonates within the meaning of the present invention.

The halogen-free styrene/maleic anhydride copolymers suitable according to the invention as component B. have random structures. Copolymers having random structures of this type can preferably be prepared from the corresponding monomers by a continuous mass or solution polymerisation with incomplete conversions.

The proportions of the two components in the styrene/maleic anhydride copolymer, of random structure, suitable according to the invention can be varied within wide limits. The preferred content of maleic anhydride is between 10 and 25% by weight.

In place of styrene and α-methylstyrene suitable nuclear-alkylated styrenes, are for example vinyltoluene and 2,4-dimethylstyrene.

The molecular weights of the styrene/maleic anhydride copolymers, of random structure, suitable according to the invention as component B.), can vary over a relatively wide range. A limiting viscosity number of [η] of 0.4–0.9 (measured in dimethylformamide at 25°

C.; see in this context: Hoffmann, Krömer, Kuhn, Polymeranalytik I (Methods of Polymer Analysis I) Stuttgart 1977, pages 316 et seq.) is preferred for these products.

The halogen-free phosphorus compounds suitable according to the invention as component C.) are generally known (see, for example, Ullmann, Enzyklopädie der technischen Chemie (Encyclopedia of Industrial Chemistry), Vol. 18, pages 301 et seq., 1979; Houben-Weyl, Meth. d. org. Chemie (Meth. of Org. Chemistry), Vol. 12/1, page 43, page 136; Beilstein, Vol. 6, page 177).

Examples of phosphorus compounds suitable according to the invention as component C.), formula (I), are triphenyl phosphate, tricresyl phosphate, diphenyl 2-ethylcresyl phosphate, tri(isopropylphenyl)phosphate, diphenyl methanephosphonate, diethyl phenylphosphonate, triphenylphosphine oxide or tricresylphosphine oxide.

The tetrafluoroethylene polymers suitable according to the invention as component D.), are polymers having fluorine contents of 65 to 76% by weight, preferably 70 to 76% by weight. Examples are polytetrafluoroethylene, tetrafluoroethylene/hexafluoropropylene copolymers or tetrafluoroethylene copolymers with small amounts of fluorine-free, copolymerisable ethylenically unsaturated monomers.

These polymers are known. They can be prepared by known processes, thus, for example, by polymerisation or tetrafluoroethylene in an aqueous medium using a catalyst forming free radicals, for example sodium, potassium or ammonium peroxydisulphate, under pressures of 7 to 71 kg/cm$^2$, and at temperatures of 0 to 200° C., preferably at temperatures of 20° to 100° C. (U.S. Pat. No. 2,393,967). The density of these materials is preferably in the range 2.0 to 2.3 g/m$^3$, and the particle sizes are preferably in the range 100 to 1,000 μm.

The thermoplastic moulding compositions according to the invention can contain other known additives for polycarbonates or for styrene/maleic anhydride copolymers, such as stabilisers, pigments, flow agents, release agents and/or antistatics.

The moulding compositions according to the invention, consisting of components A., B., C. and D. and, where appropriate, other known additives, such as stabilisers, pigments, flow agents, release agents and/or antistatics, are prepared by mixing the particular constituents in a known manner and melt-compounding or melt-extruding, at temperatures of 220° to 330° C., in customary units, such as internal kneaders or single- or twin-screw extruders, or by mixing solutions of the particular components in suitable organic solvents, for example in chlorobenzene, and evaporating the solution mixtures in customary units, for example in evaporating extruders.

Thus, the present invention also relates to a process for the preparation of thermoplastic moulding compositions consisting of components A., B., C. and D. and, where appropriate, stabilisers, pigments, flow agents, release agents and/or antistatics, which is characterised in that components A., B., C. and D. and, where appropriate, stabilisers, pigments, flow agents, release agents and/or antistatics are, after mixing has taken place, melt-compounded or melt-extruded at temperatures of 220° to 330° C. in customary units, or in that the solutions of these components in suitable organic solvents are, after mixing has taken place, evaporated in customary units.

The moulding compositions of the present invention can be used for the production of moulded articles of every type. In particular, it is possible to produce moulded articles by injection moulding. Examples of moulded articles which can be produced are: housing parts of all types (for example for domestic equipment, such as coffee machines or mixers) or cover sheets for the building sector and parts for the automobile sector. In additon, they are used in the area of electrotechnology because they have very good electrical properties.

Another form of processing is the production of moulded articles by deep-drawing or thermoforming of sheets or films which have previously been produced by extrusion.

EXAMPLES

Components used in the blend

A: Polycarbonate of 2,2-bis(4-hydroxyphenyl)propane (bisphenol A) with a relative solution viscosity of 1.320, measured in methylene chloride, at 23° and at a concentration of 0.5% by weight.

B: Preparation of the copolymer resins 750 parts of a mixture having a composition as shown in Table 1 are initially introduced into a jacketed vessel which is provided with an internal thermometer, stirrer, inlet and outlet, and are heated to 130° C. Then, a monomer stream of 1,100 parts of the same composition is metered in, and at the same time the same amount of polymer solution is removed from the vessel, in such a manner that the level in the vessel is maintained. About 0.05 part per hour of tert.-butyl perpivalate (75% strength in dibutyl phthalate) is continuously added to the monomer stream. After about 2 h, a constant conversion of about 40% has been achieved. 0.1% by weight of 2,6-di-t-butyl-p-cresol is added to the polymer solution from which monomers and volatile constituents are then removed in an evaporating extruder. The relevant limiting viscosity numbers, determined by measurement in dimethylformamide (DMF) at 25° C., are listed in Table 1.

TABLE 1

Composition of the feed monomers and of the copolymers B

| | Feed monomers (% by weight) | | Copolymer (% by weight) | | Limiting viscosity number of the copolymer [η] |
|---|---|---|---|---|---|
| | styrene | maleic anhydride | styrene | maleic anhydride | |
| B1 | 95.5 | 4.4 | 89 | 11 | 0.499 |
| B2 | 93.8 | 6.2 | 84.5 | 15.5 | 0.514 |
| B3 | 93.2 | 6.8 | 83 | 17 | 0.518 |
| B4 | 92.0 | 8.0 | 80 | 20 | 0.503 |

C1: Diphenyl cresyl phosphate
C2: Triphenyl phosphate
C3: Triphenylphosphine oxide
C4: Diphenyl methylphosphonate
D: Polytetrafluoroethylene in the form of a powder with a particle size of 500–650 μm (Hostaflon TF 2026 supplied by Hoescht).

The compounding of components A, B 1–4, C 1–4 and D was carried out in a twin-shaft extruder (ZSK 32 supplied by Werner & Pfleiderer) at temperatures between 230° and 250° C.

The moulded articles were produced in an injection moulding machine at 250° C.

The fire behaviour of the sample was measured in accordance with UL-Subj. 94 V with test specimens 1.6 and 3.2 mm thick. The UL 94 V test is carried out as follows:

Samples of substance are moulded into bars with dimensions 127×12.7×1.6 mm or 127×12.7×3.2 mm. The bars are mounted vertically in such a manner that the underside of the test specimen is located 305 mm above a strip of bandage material. Individual ignition of each test bar is carried out by two consecutive ignition processes lasting 10 sec.

The combustion properties after each ignition procedure are observed, and the sample is then assessed. A Bunsen burner with a 10 mm (⅜ inch) high blue flame of natural gas, with a heat content of $3.73 \times 10^4$ kJ/m$^3$ (1.000 BTU per cubic foot) is used to ignite the sample.

The UL 94 V-O classification comprises the properties of materials which are described below and which are tested by the UL-94 method. The materials in this class contain no samples which burn for longer than 10 sec. after each exposure to the test flame; they show no total burning time of more than 50 sec. on exposure of each set of samples twice to the flame; they contain no samples which burn completely up to the holding clamp fixed on the upper end of the sample; they show no samples which, owing to burning droplets or particles, ignite the cottonwool located beneath the sample; nor do they contain samples which glow for longer than 30 sec. after removal of the test flame.

Other UL 94 classifications designate samples which exhibit a longer afterburn period (classification V-1) or which, in addition, release burning droplets or particles which ignite the cottonwool located beneath the sample (classification V-2). The classification n.p. means "not passed" and denotes that the samples exhibited an afterburn time of >30 sec.

The exact compositions of the moulding compositions tested and the UL 94 classifications obtained can be seen in the table which follows.

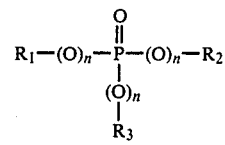

in which $R_1$, $R_2$ and $R_3$, independently of one another, denote a $C_1$–$C_8$-alkyl or an optionally alkyl-substituted $C_6$–$C_{20}$-aryl, and n is 0 or 1, and (D) 0.05–5 parts by weight, again based on 100 parts of the total weight of (A)+(B), of a tetrafluoroethylene polymer.

2. A composition according to claim 1, in which component (B) comprises 90–75% by weight of the styrene(s) and 10 to 25% by weight of maleic anhydride.

3. A composition according to claim 1, comprising 5 to 15 parts by weight of component (C).

4. A composition according to claim 1 comprising 0.1 to 1 part by weight of component (D).

5. A moulding composition containing a composition as claimed in claim 1 and at least one additive selected from stabilisers, pigments, flow agents, release agents and antistatics.

6. A process for the production of a moulding composition according to claim 1, in which components (A), (B), (C) and (D) are, after mixing has taken place, melt-compounded or melt-extruded, at a temperature of 220° C. to 330° C.

7. A process for the production of a moulding composition according to claim 1, in which a solution of components (A), (B), (C) and (D) in an organic solvent are mixed, and the solution mixture is then evaporated in an evaporating unit.

8. A process for the production of a moulding composition in which the process of claim 6 is carried out with inclusion in the mixture of at least one additive selected from stabilisers, pigments, flow agents, release agents and antistatics.

9. A thermoplastic moulding composition whenever obtained by the process of claim 6.

10. A moulded article whenever formed of a moulding composition as claimed in claim 1.

11. A process for the production of a moulding composition in which the process of claim 7 is carried out with inclusion in the mixture of at least one additive selected from stabilizers, pigments, flow agents, release agents and antistatics.

|  | A parts by weight | B1 parts by weight | B2 parts by weight | B3 parts by weight | B4 parts by weight | C1 parts by weight | C2 parts by weight | C3 parts by weight | C4 parts by weight | D parts by weight | UL 94 (1.6 mm) | UL 94 (3.2 mm) |
|---|---|---|---|---|---|---|---|---|---|---|---|---|
| Comparison tests | | | | | | | | | | | | |
| V1 | 70 | 30 | | | | | | | | | n.p. | n.p. |
| V2 | 70 | | 30 | | | | | | | | n.p. | n.p. |
| V3 | 70 | | | 30 | | | | | | | n.p. | n.p. |
| V4 | 70 | | | | 30 | | | | | | n.p. | n.p. |
| Tests according to the present invention | | | | | | | | | | | | |
| E1 | 70 | 30 | | | | 10 | | | | 0.2 | V-2 | V-0 |
| E2 | 70 | | 30 | | | 10 | | | | 0.2 | V-1 | V-0 |
| E3 | 70 | | | 30 | | 10 | | | | 0.25 | V-1 | V-0 |
| E4 | 70 | | | | 30 | 7.5 | | | | 0.2 | V-1 | V-0 |
| E5 | 70 | | 30 | | | 10 | | | | 0.3 | V-1 | V-0 |
| E6 | 75 | | 25 | | | 10 | | | | 0.25 | V-0 | V-0 |
| E7 | 70 | | 30 | | | | 10 | | | 0.25 | V-1 | V-0 |
| E8 | 70 | | 30 | | | | | 10 | | 0.3 | V-1 | V-0 |
| E9 | 70 | | 30 | | | | | | 7.5 | 0.25 | V-2 | V-0 |
| E10 | 75 | | | | 25 | | | 10 | | 0.25 | V-0 | V-0 |

We claim:

1. A thermoplastic moulding composition consisting of
    (A) 50 to 90 parts by weight of a thermoplastic, halogen-free, aromatic polycarbonate of 2,2-bis-(4-hydroxyphenyl)-propane or 1,1-bis-(4-hydroxyphenyl-cyclohexane,
    (B) 10 to 50 parts by weight of a halogen-free copolymer of random structure, comprising 95 t 70% by weight, of styrene, α-methylstyrene or nuclear-alkylated styrene(s), or mixtures of these vinyl aromatics, and 5 to 30% by weight, of maleic anhydride,
    (C) 5 to 15 parts by weight, based on 100 parts of the total weight of (A)+(B), of a halogen-free phosphorus compound of the general formula